United States Patent [19]

Powell et al.

[11] Patent Number: 4,553,352
[45] Date of Patent: Nov. 19, 1985

[54] PLANT CONTAINER FOR DRAINING MOISTURE FROM THE SOIL

[75] Inventors: Bert R. Powell, Jacksonville; Albert L. Collins, Frankston, both of Tex.

[73] Assignee: Texas Processed Plastics, Inc., Jacksonville, Tex.

[21] Appl. No.: 579,032

[22] Filed: Feb. 10, 1984

[51] Int. Cl.$^4$ .............................................. A01G 9/02
[52] U.S. Cl. .................................. 47/71; 220/DIG. 6; 220/1 C; 47/66; 47/67
[58] Field of Search .................. 47/71, 66, 79, 80, 81, 47/14, 59, 61, 40.5, 67, 82, 84, 39; 220/DIG. 6, 1 C; 215/100.5; 222/485

[56] References Cited

U.S. PATENT DOCUMENTS

| D. 242,161 | 11/1976 | Dziewulki | D11/2 |
|---|---|---|---|
| 805,491 | 11/1905 | Sedlack | 47/66 |
| 1,375,333 | 4/1921 | Straub | 47/66 |
| 2,344,202 | 4/1944 | Carlson | 47/79 |
| 2,885,825 | 5/1959 | Longacre | 47/79 |
| 3,107,028 | 10/1963 | De Robertis | 220/60 |
| 3,381,410 | 5/1968 | Potain | 47/71 X |
| 3,804,331 | 4/1974 | Levey | 47/66 X |
| 4,059,920 | 11/1977 | Worrell | 47/67 |
| 4,138,803 | 2/1979 | Sherlock | 47/67 |
| 4,142,324 | 3/1979 | Magyar | 47/78 X |
| 4,167,080 | 7/1979 | Midkelson | 47/71 |
| 4,198,784 | 4/1980 | Sukert | 47/79 |
| 4,446,652 | 5/1984 | Anderson | 47/67 X |

FOREIGN PATENT DOCUMENTS

| 1910767 | of 1964 | Fed. Rep. of Germany | 47/71 |
|---|---|---|---|
| 572301 | 2/1976 | Switzerland | 47/79 |

Primary Examiner—Robert A. Hafer
Assistant Examiner—Danton DeMille
Attorney, Agent, or Firm—Jerry W. Mills; Gregory M. Howison; Nina L. Medlock

[57] ABSTRACT

A plant container including a main container (10) and a reservoir tray (12) for receiving fluids. The main container (10) has a plurality of orifices (14) disposed in the bottom thereof. The reservoir tray (12) is rotatable about a member (16) and has a plurality of conduit members (22) disposed thereon. When the conduit members (22) are aligned with the orifices (14), fluid is allowed to pass from the main container (10) through conduits (24) to the exterior thereof. By rotating the reservoir tray (12) to either alignment with the orifices (14) or to a position in alignment with concave depressions (26), fluid can be either drained from the soil or stored in the reservoir tray (12).

10 Claims, 5 Drawing Figures

PLANT CONTAINER FOR DRAINING MOISTURE FROM THE SOIL

TECHNICAL FIELD OF THE INVENTION

The present invention pertains in general to plant containers and, more particularly, to plant containers that drain moisture and sediments from the soil.

BACKGROUND OF THE INVENTION

To properly cultivate container grown plants, it is necessary to insure that they obtain adequate amounts of both light and water without having an excess of either. In particular, excess water can cause oversaturation of the soil which may cause the root system to rot and/or become very susceptible to disease. In addition to preventing oversaturation of the soil, it is also necessary to prevent buildup of undesirable sediments in the soil. When plants are allowed to grow in their natural environment, these sediments are normally "flushed" from the soil by natural processes and, therefore, are naturally prevented from building up. Since container grown plants are confined to a small environment, it is necessary to periodically flush sediments and the like out of the soil.

Present plant containers provide orifices in the bottom thereof to allow excess water to drain therefrom. Normally a tray is disposed under the bottom of the container to catch this excess water and allow it to either evaporate off or to "wick" back into the soil as the need arises. However, the sediments that are flushed out of the soil into this reservoir tray are also wicked back up into the soil, thus allowing the sediments to build up over time. In order to remove these sediments, it is necessary to remove the tray from the container and then saturate the soil. This can be a very timely procedure when utilized in a commercial nursery operation.

In view of the above disadvantages, there exists a need for a plant container having the capability to both prevent overwatering and allow for flushing out of the sediments contained in the soil on a periodic basis.

SUMMARY OF THE INVENTION

The present invention disclosed and claimed herein comprises a plant container that includes a main container for containing the soil and plant and having a plurality of drainage orifices disposed in the bottom thereof. A reservoir tray is disposed under the main container for receiving fluids passing through the orifices. The reservoir tray is spaced a predetermined distance from the orifices and rotatable with respect to the main container. A plurality of conduit members are provided on the bottom of the reservoir tray for selective alignment with the drainage orifices. Alignment with the drainage orifices allows fluid in the soil to pass through the conduit members and exterior to the reservoir tray. By rotating the reservoir tray to a different position, fluid drains through the orifices and is stored in the reservoir tray.

In yet another embodiment of the present invention, concave depressions are provided in the bottom of the main container for receiving the conduit members in a nonaligned position. These concave depressions prevent rotation of the tray without an external force applied thereto.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
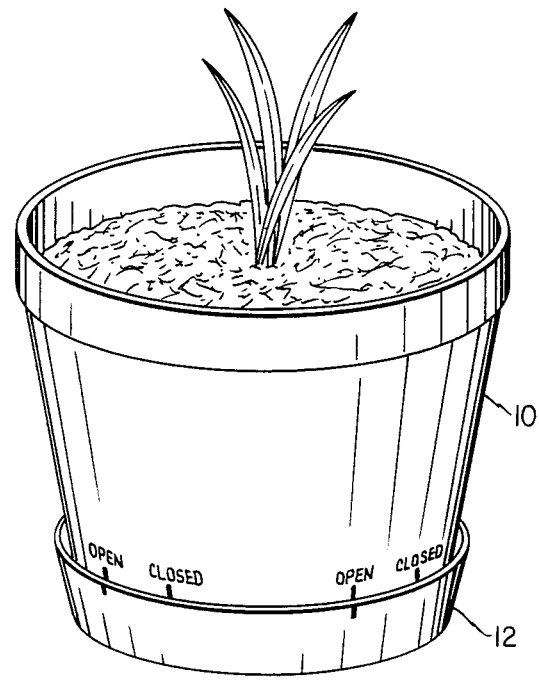
FIG. 1 illustrates a perspective view of a plant container in accordance with the present invention.
Figure 2:
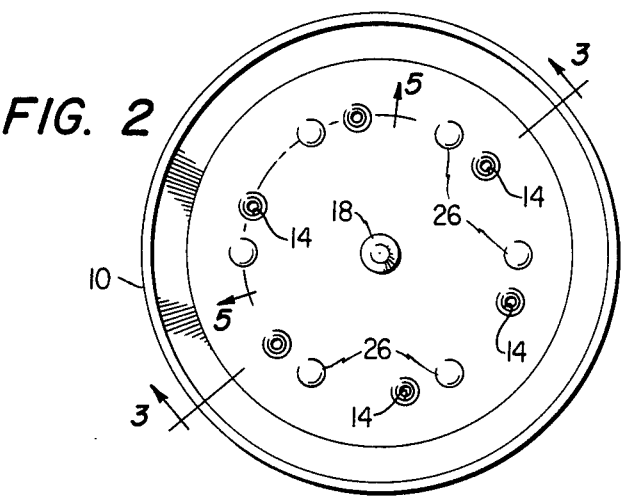
FIG. 2 illustrates a top view of the plant container.

Referring now to FIGS. 1 and 2, there are illustrated a perspective view and a top view of a plant container in accordance with the present invention. The plant container includes a main container 10 and a reservoir tray 12. The main container 10 is functional to house potting soil and plants disposed therein. The reservoir tray 12 is functional to store water resulting from "overwatering" of the soil in the main container 10. This water exits the main container 10 through orifices 14 disposed in the bottom of the main container 10. As will be described hereinbelow, the orifices 14 can be placed in communication with either the interior of the reservoir tray 12 or the exterior thereof such that water can either be stored in the reservoir tray 12 or extracted therefrom to an external reservoir. This is accomplished by rotating the reservoir tray 12. Registration marks are provided on both the main container 10 and the reservoir tray 12 to determine whether the orifices 14 are in communication with the interior of the tray 12 or the exterior of the main container 10.

Figure 3:
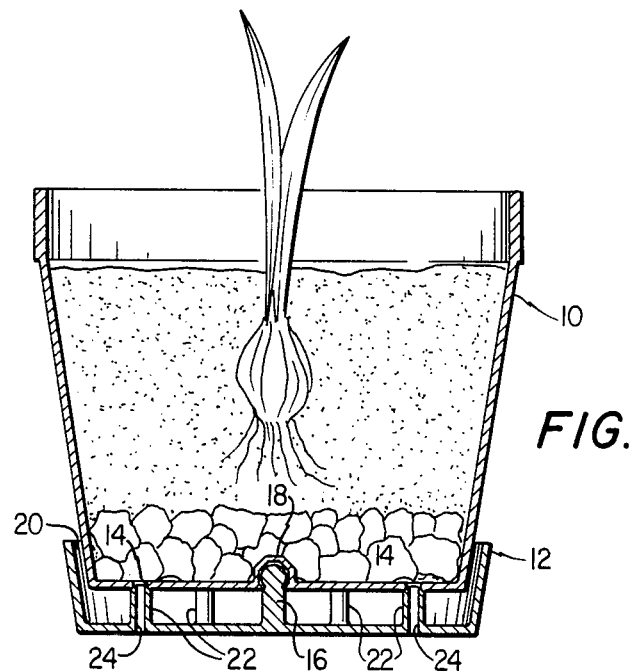
FIG. 3 illustrates a cross-sectional view of the plant container in accordance with the present invention with the reservoir tray rotated to the open position.
Figure 4:
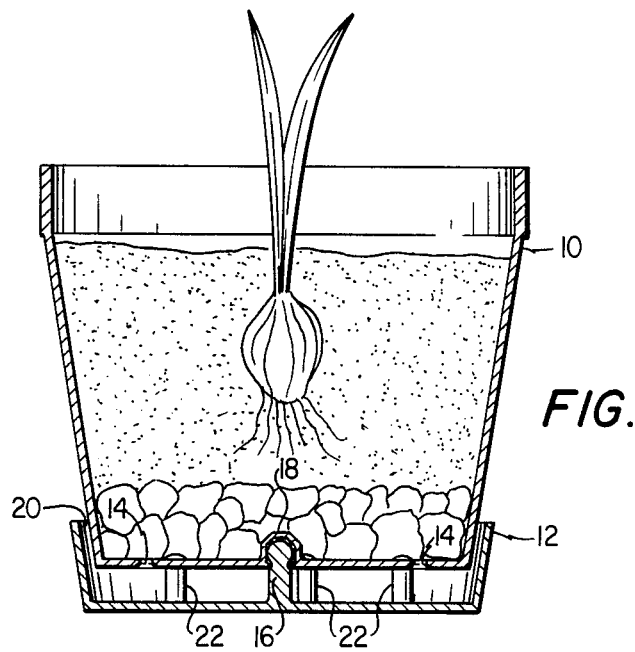
FIG. 4 illustrates a cross-sectional diagram of the plant container with the reservoir tray rotated to the closed position.

Referring now to FIGS. 3 and 4, there are illustrated cross-sectional views of the plant container illustrating both the "open" position in which the orifices 14 are in communication with the exterior of the reservoir tray 12 and the "closed" position in which the orifices 14 are in communication with the interior of the reservoir tray 12. The reservoir tray 12 has a bearing and spacing member 16 disposed in the rotational center thereof and operable to mate with a socket member 18 in the main container 10. The spacing member 16 is operable to space the lower surface of the reservoir tray 12 from the lower surface of the main container 10 such that water exiting the orifices 14 can accrue in the bottom of the reservoir tray 12 and allow air circulation therein to enhance evaporation. To this end, the outer perimeter of the reservoir tray 12 is sufficiently large enough to provide an air space 20 between the reservoir tray 12 and the main container 10.

The reservoir tray 12 has a plurality of conduit members formed integrally therewith and disposed at right angles to the bottom thereof. The conduit members 22 have a conduit 24 disposed through the middle thereof and the conduit members 22 are oriented on the reservoir tray 12 such that each of the conduit members 22 mates up with each of the orifices 14 in a given position. All of the conduit members 22 and all of the orifices 14 are equally spaced about a common radius from the rotational center of the reservoir tray 12 such that continuous rotation of the reservoir tray 12 allows each of the conduit members 22 to mate up with any of the orifices 14.

Each of the orifices 14 has a beveled contour that mates with the upper end of one of the conduit members 22 which also has a beveled contour. The beveled contours of the orifices 14 and the conduit members 22 allow for a seal to be formed therebetween. To facilitate this seal, the height of the conduit member 22 above the surface of the reservoir tray 12 is slightly greater than the distance between the lower surface of the main container 10 and the upper surface of the reservoir tray 12. Therefore, the conduit members 22 are forced into a mating relationship with the orifices 14. To facilitate this, the reservoir tray 12 is manufactured from a resilient material such as plastic which "flexes" and, when deformed, relaxes back to the original shape.

In the cross-sectional view illustrated in FIG. 3, fluid contained within the main container 10 is allowed to pass through the conduit 24 to the exterior of the plant container. However, when it is desirable to contain the water within the reservoir tray 12, the reservoir tray 12 is rotated to a position such that the conduit members 22 are not aligned with the orifices 14, as illustrated in FIG. 4. In this configuration, water passes from the main container 10 to the orifices 14 into the reservoir tray 12 for storage therein.

Figure 5:
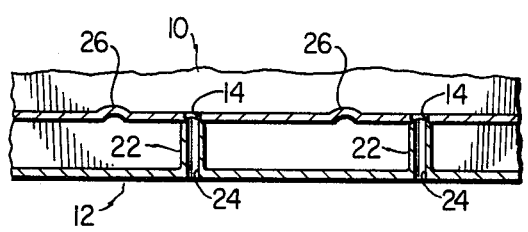
FIG. 5 illustrates a sectional view taken along arc 5—5 of FIG. 4 illustrating the sealing mechanism.

Referring now to FIG. 5, there is illustrated a sectional diagram taken along arc 5—5 of FIG. 2 illustrating two of the conduit members 22 and the reservoir tray 10 rotated to the closed position. In the closed position, the conduit members 22 are rotated away from the orifices 14 and aligned with a concave depression 26 that is formed in the lower surface of the main container 10. The concave depression 26 is functional to relieve flexing of the reservoir tray 10 when the conduit members 22 are not mated up with the orifices 14. Since the height of the conduit members 22 above surface of the reservoir tray 12 is greater than the distance between the upper surface of the reservoir tray 12 and the lower surface of the main container 10, flexing of the reservoir tray results when the conduit members 22 are not aligned with the orifices 14. If the reservoir tray 12 is maintained in a flexed position, permanent deformation may result. Therefore, the concave depressions 26 provide a position at which flexion can be removed from the reservoir tray 12. In addition, the concave depressions 26 also provide a tactile feedback for the individual when rotating the reservoir tray 12.

To position the conduit members 22 in either the orifices 14 or the concave depressions 26, the registrations on the exterior of both the reservoir tray 12 and the main container 10 can be utilized. To facilitate proper positioning without the registrations, the concave depressions 26 are not evenly spaced between adjacent ones of the orifices 14. Therefore, the distance between a given orifice 14 and concave depressions 26 in one direction of rotation is different from that in the opposite direction of rotation. This combination with the tactile feedback allows an individual to properly position the reservoir tray 12 in either the open or closed position.

In summary, there has been provided a plant container having a main container with a reservoir tray rotatably disposed on the bottom thereof. Orifices disposed in the bottom of the main container are allowed to communicate with the interior of the reservoir tray or with the exterior thereof depending upon the rotational position of the reservoir tray. When the orifices communicate with the interior of the reservoir tray, excess fluid is contained therein for evaporation and/or wicking back into the container. When the reservoir tray is positioned such that the orifices are connected with the exterior of the plant container, excess water drains therefrom.

Although the preferred embodiment has been described in detail, it should be understood that various changes, substitutions and alterations can be made therein without departing from the spirit and scope of the invention as defined by the appended claims.

What is claimed is:

1. A plant container for containing soil and plants, comprising:
   a main container for containing the soil and plants and having a plurality of drainage orifices disposed in the bottom thereof;
   a reservoir tray disposed under said main container for receiving fluids passing through said orifices, said reservoir tray spaced a predetermined distance from said orifices;
   means for selective fluid communication of said orifices to the exterior of said reservoir tray to facilitate flushing of sediments from the soil;
   said fluid communication means comprises a plurality of conduit members connected to said reservoir tray, said reservoir tray moveable with respect to said main container with each of said conduit members mating with one of said orifices such that selective movement of said reservoir tray aligns each of said conduit members with a respective one of said orifices to allow the fluid to flow therethrough to the exterior of said reservoir tray.

2. The plant container of claim 1 wherein said reservoir tray is rotatable about a central point with respect to said main container and said orifices are evenly dispersed around the rotational center of said reservoir tray along a common arcuate path.

3. The plant container of claim 1 further comprising registration means for indicating whether said conduit members are aligned with the respective one of said orifices.

4. The plant container of claim 1 further comprising locking means for maintaining said conduit members at a location other than the alignment location with respect to one of said orifices.

5. A plant container for containing soil and plants, comprising:
   a main container for containing the soil and plants and having a plurality of drainage orifices disposed in the bottom thereof, said drainage orifices evenly disposed along a common circular path;
   a reservoir tray disposed under said main container for receiving fluids passing through said drainage orifices, said reservoir tray spaced a predetermined distance from said orifices;
   means for rotatably supporting said reservoir tray about the center of the common circular path of said drainage orifices; and
   a plurality of conduit members disposed on said reservoir tray and rotatable therewith, said conduit members disposed about a common circular path with respect to the rotational center of said reservoir tray and operable to mate with each of said drainage orifices to pass fluid therefrom to the exterior of said reservoir tray;

said reservoir tray rotatable to rotate said conduit members into alignment with said drainage orifices to drain fluid from the soil in said main container and rotatable to a position such that said conduit members are not in alignment with said drainage orifices to allow fluid to drain in said reservoir tray for storage therein.

6. The plant container of claim 5 and further comprising locking means to lock said reservoir tray in an aligned position with said conduit members aligned with said drainage orifices and also for locking said reservoir tray in a nonaligned position with said conduit members disposed at a position other than alignment with said drainage orifices.

7. The plant container of claim 5 and further comprising registration marks for indicating whether said conduit members are aligned with said drainage orifices or in a position other than alignment with said drainage orifices.

8. A plant container for containing soil and plants, comprising:
- a main container for containing the soil and plants and having a flat circular bottom, said bottom having a plurality of drainage orifices disposed in the bottom thereof and disposed evenly along a common circular path about the center thereof;
- a reservoir tray disposed under said main container for receiving fluid passing through said orifices;
- a pivoting member disposed on said reservoir tray for spacing said reservoir tray from the bottom of said main container and pivoting thereabout and for allowing said reservoir tray to rotate about the center of said drainage orifices;
- a plurality of conduit members disposed on said reservoir tray and disposed perpendicular therewith about a common circular path to align with the common circular path of said drainage orifices, said conduit members for mating with said drainage orifices to pass fluid therethrough to the exterior of said reservoir tray;
- said conduit members dimensioned to have a length longer than the distance between said reservoir tray and the bottom of said main container, said orifices having an inward and upwardly tapered contour with an oppositely tapered contour on the mating end of said conduit member such that rotation of said reservoir tray with said conduit members to a position that aligns said conduit members with said orifices causes an upward force to urge said conduit members into said orifices to effect a seal therebetween; and
- a plurality of concave depressions in the bottom of said main container disposed about the common circular path of said drainage orifices, said concave depressions for receiving the mating end of said conduit members when said reservoir tray is rotated to allow said conduit members to align therewith.

9. The plant container of claim 8 and further comprising registration marks for indicating the position of said conduit members.

10. The plant container of claim 8 wherein said depressions are biased toward one of said drainage orifices such that tactile feedback of the position of said conduit members can be obtained.

* * * * *